United States Patent
Ichinokawa

(10) Patent No.: US 6,717,743 B2
(45) Date of Patent: Apr. 6, 2004

(54) LENS MOVING DEVICE

(75) Inventor: Kazuhiro Ichinokawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 286 days.

(21) Appl. No.: 09/884,085

(22) Filed: Jun. 20, 2001

(65) Prior Publication Data

US 2002/0001137 A1 Jan. 3, 2002

(30) Foreign Application Priority Data

Jun. 28, 2000 (JP) ..................................... P2000-193969

(51) Int. Cl.$^7$ ................................................. G02B 15/14
(52) U.S. Cl. ........................ 359/699; 359/701; 359/702
(58) Field of Search ............................... 359/694, 696, 359/699, 700, 701, 702–706; 396/80, 82

(56) References Cited

U.S. PATENT DOCUMENTS

| 4,684,233 A | * | 8/1987 | Kodaira et al. ............... 396/90 |
| 4,740,065 A | * | 4/1988 | Aoyagi ........................ 359/704 |
| 5,264,966 A | * | 11/1993 | Okada et al. ................ 359/696 |
| 5,642,232 A | | 6/1997 | Nomura et al. ............. 359/701 |
| 5,669,021 A | | 9/1997 | Sato ............................. 396/72 |
| 5,966,249 A | | 10/1999 | Aoki ........................... 359/699 |
| 6,490,099 B2 | * | 12/2002 | Sasaki ........................ 359/700 |

* cited by examiner

Primary Examiner—Huy Mai
(74) Attorney, Agent, or Firm—Greenblum & Bernstein, P.L.C.

(57) ABSTRACT

A lens moving device comprises a cam follower which is provided to a lens holding frame supporting a lens, and a cam gear with which the cam follower is engaged. The cam gear is rotated by a stepping motor, so that the lens holding frame and the lens move along the optical axis thereof. The cam gear is molded from synthetic resin and is provided with a stopper at the both ends of a non-operative area, in which the cam follower does not come in contact during a normal operation. The non-operative area has a gate mark, which is formed during the resin molding process. The stopper prevents the cam follower from interfering with the gate mark.

5 Claims, 3 Drawing Sheets

LENS MOVING DEVICE

BACKGROUND OF THE INVENTION

1. Field of the Invention

The present invention relates to a lens moving device which is provided in a digital camera, for example, to move a photographing lens along the optical axis thereof.

2. Description of the Related Art

Conventionally, there is known a lens moving device, mounted in a digital camera, which is constructed in such a manner that a cam follower, provided on a support mechanism of a lens, is engaged with a cam surface of a cam gear rotated by a motor. Namely, the lens is moved along the optical axis by the rotation of the cam surface. The cam gear is usually molded from synthetic resin. Generally, a portion corresponding to an injection mouth (provided in a mold to inject melted synthetic resin into the mold) is formed on a member molded from the synthetic resin, as a gate mark. If this gate mark is recessed, the cam follower may engage the gate mark, which may cause the cam gear to stick. Therefore, the gate mark is formed on an area (or non-operative area) of the cam gear, where the cam follower does not engage in a normal operation.

However, if the motor overruns a predetermined drive amount, the cam follower may enter the non-operative area, which may cause the cam follower to stick in the gate mark. If the cam follower sticks in the gate mark, the movement of the lens is stopped.

SUMMARY OF THE INVENTION

Therefore, an object of the present invention is to provide a lens moving device in which the cam follower does not engage the gate mark even if the motor overruns.

According to the present invention, there is provided a lens moving device comprising a lens support mechanism, a drive source, a cam member, and a cam follower.

The cam member is provided with a non-operative area with which the cam follower is not in contact during a normal operation. The non-operative area has a gate mark formed during the resin molding process. The stopper prevents the cam follower from interfering with the gate mark. The lens support mechanism supports a lens in such a manner that the lens moves along the optical axis thereof. The drive source moves the lens along the optical axis. The cam member is rotated by the drive source. The cam member is molded from synthetic resin and is provided with a stopper. The cam follower comes in contact with the cam member to transmit the rotational movement of the cam member to the lens support mechanism as a linear movement of the lens along the optical axis. The cam member is provided with a non-operative area with which the cam follower does not come in contact during a normal operation. The non-operative area has a gate mark formed during the resin molding process. The stopper prevents the cam follower from interfering with the gate mark.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
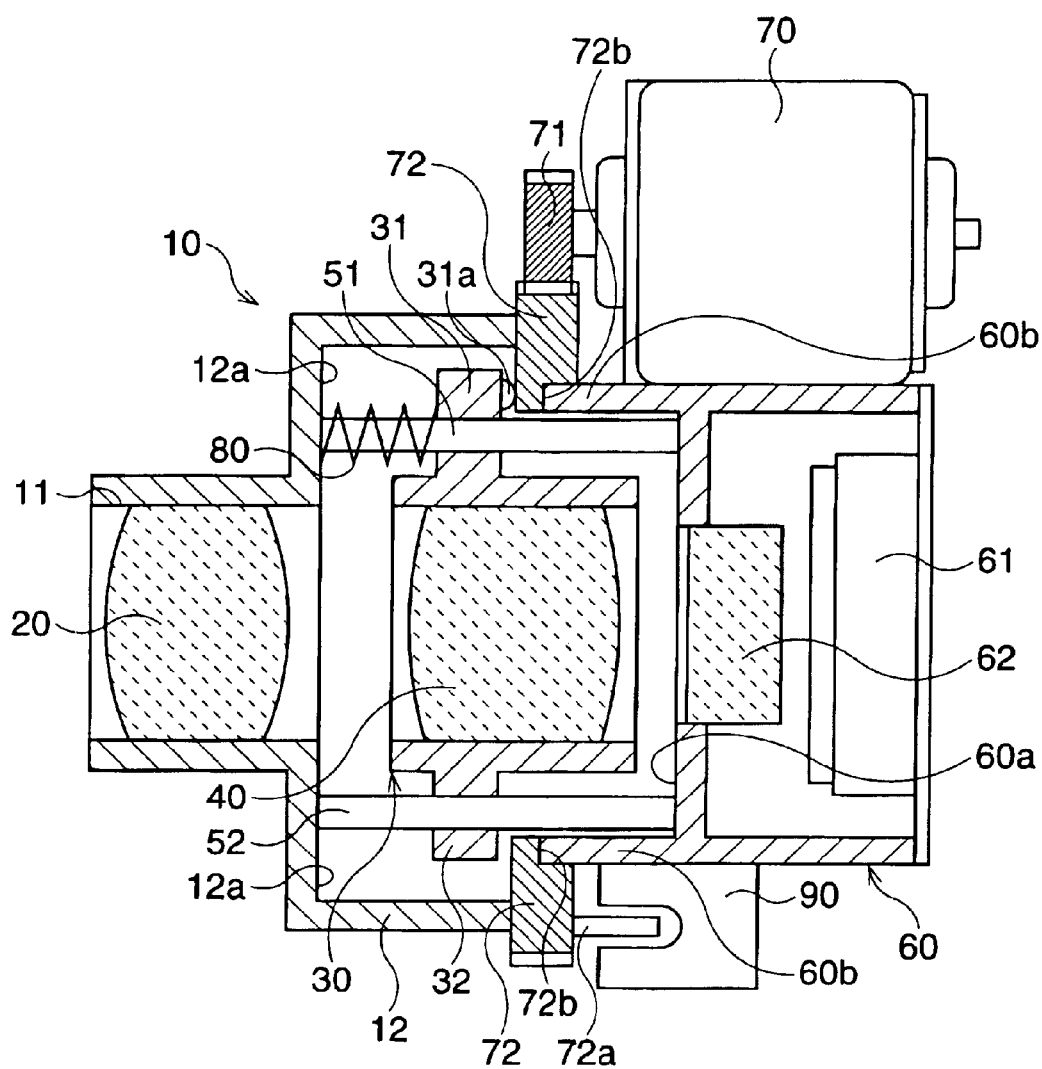
FIG. 1 is a sectional view of a photographing optical system of a digital camera to which an embodiment of the present invention is applied.

The present invention will be described below with reference to an embodiment shown in the drawings.

FIG. 1 is a sectional view of a photographing optical system of a digital camera to which an embodiment of the present invention is applied.

A lens barrel 10 has a small diameter portion 11 and a large diameter portion 12. A front lens group 20 is held in the small diameter portion 11, and a lens holding frame 30, in which a rear lens group 40 for performing a focusing operation is held, is disposed in the large diameter portion 12. An imaging device holding member 60, to which a CCD sensor 61 is fixed, is provided to the opposite side of the small diameter portion 11 with regard to the lens holding frame 30. An optical low pass filter 62 is disposed between the CCD sensor 61 and the rear lens group 40. Namely, light, which is reflected from a subject and passes through the front lens group 20 and the rear lens group 40, is led to the CCD sensor 61 through the optical low pass filter 62, so that the subject image is formed on a light receiving area of the CCD sensor 61.

Guide shafts 51 and 52 are disposed in the large diameter portion 12. One end of each of the guide shafts 51 and 52 is fixed on an inner wall surface 12a of the large diameter portion 12, which is perpendicular to the optical axes of the front lens group 20 and the rear lend group 40. The other end of each of the guide shafts 51 and 52 is attached to an outer wall surface 60a of the imaging device holding member 60. The guide shafts 51 and 52 are positioned in such a manner that the central axes thereof are parallel to the optical axes of the front lens group 20 and the rear lens group 40. Holding frame support portions 31 and 32 extending in radial directions are formed on an upper surface and a lower surface of the lens holding frame 30 in the drawing. A hole is formed in each of the holding frame support portions 31 and 32, each of the guide shafts 51 and 52 is inserted in the hole. Thus, the lens holding frame 30 is movably supported by the guide shafts 51 and 52 along the optical axis of the rear lens group 40.

A stepping motor 70 is fixed on an upper surface of the imaging device holding member 60 in the drawing. The imaging device holding member 60 has a cylindrical wall 60b, and a step portion 72b of a ring-shaped cam gear (or cam member) 72 is rotatably engaged with a tip portion of the cylindrical wall 60b. A pinion gear 71 is fixed to an output shaft of the stepping motor 70, and the cam gear 72 is meshed with the pinion gear 71. Thus, the cam gear 72 is rotated by the stepping motor 70. The front lens group 20 side of the cam gear 72 is provided with a ring-shaped cam surface, and the opposite side to the cam surface is provided with a wall-shaped barrier (or dog) 72a.

A cam follower 31a, which is slidably engaged with the cam surface of the cam gear 72, is formed on the holding frame support portion 31. In the guide shaft 51, a compression spring 80 is wound around a portion between the inner wall surface 12a and the holding frame support portion 31, to always urge the holding frame support portion 31 toward the cam gear 72. Therefore, the cam follower 31a comes into contact with the cam surface of the cam gear 72. Namely, when the stepping motor 70 is driven so that the cam gear 72 is rotated through the pinion gear 71, the lens holding frame 30 is moved along the optical axis of the rear lens group 40 in accordance with the inclination of the cam surface. Thus, the rotational movement of the cam gear 72 is transmitted to the lens holding frame 30 as a linear movement of the rear lens group 40 along the optical axis. The cam surface includes a focusing area from the infinity in-focus position to the shortest distance in-focus position of the rear lens group 40.

An initial position sensor 90 is fixed on a lower surface of the imaging device holding member 60 in the drawing. The initial position sensor 90 is a photo-interrupter having a light-emitting diode and a photoreceptor element, between which the barrier 72a can pass due to the rotation of the cam gear 72. The pass of a tip portion of the barrier 72a can be recognized by sensing the rotational direction of the cam gear 72 and a change of the value of the output electric current of the initial position sensor 90.

Figure 2:
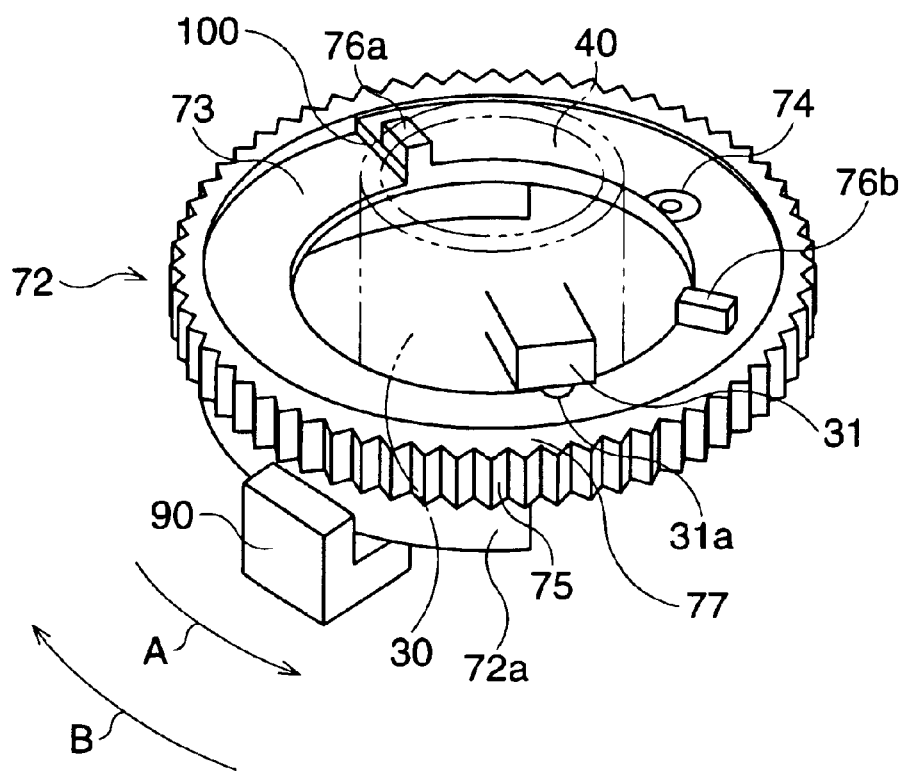
FIG. 2 is a perspective view showing a cam gear and a rear lens group.

FIG. 2 is a perspective view showing the cam gear 72 and the lens holding frame 30 supporting the rear lens group 40.

The cam surface 73 is not perpendicular to the optical axis of the rear lens group 40, but is inclined to a plane perpendicular to the optical axis. In FIG. 2, the cam follower 31a is engaged with a relatively high position of the inclination of the cam surface 73. If the cam gear 72 is rotated in the A-direction, the cam follower 31a is engaged with a relatively low position of the inclination of the cam surface 73. From this condition, if the cam gear 72 is rotated in the B-direction, the cam follower 31a is engaged with a relatively high position of the inclination of the cam surface 73. Thus, the lens holding frame 30 or the rear lens group 40 are moved along the optical axis, a focusing operation is performed. A flat surface 77, which is a plane perpendicular to the optical axis of the rear lens group 40, is provided to the whole of the outer periphery of the cam surface 73. The large diameter portion 12 (see FIG. 1) comes into contact with the flat surface 77.

The barrier 72a is an arcuatedly bent plate, which is formed on a surface opposite to the cam surface 73 and extends over a focusing area included in an operative area which is inclined in the cam surface 73. The barrier 72a is formed in the circular direction of the cam gear 72 in such a manner that the pass of an end of the barrier 72a can be sensed by the initial position sensor 90 when the rear lens group 40 is positioned at the infinity in-focus position.

The rotational amount of the cam gear 72 relative to the rotational amount of one pulse of the stepping motor 70 is set in such a manner that, when the stepping motor 70 is driven by a predetermined number of pulses, the cam follower 31a is moved from an end portion of the focusing area to the other end portion of the focusing area.

The cam gear 72 is molded from synthetic resin. Namely, melted synthetic resin is injected into the injection mouth of the mold to manufacture the cam gear 72, and a gate mark 74 is formed on a surface of the cam gear 72 because of the injection mouth, during the resin molding process. Since gear teeth 75 are formed on a side surface of the cam gear 72, it is not allowed to form the gate mark 74 on the side surface. Further, since the surface opposite to the cam surface 73 of the cam gear 72 is provided with the step portion 72b (see FIG. 1) and the barrier 72a, there is not enough breadth for the diameter of the injection mouth such that the synthetic resin is injected into the mold, and therefore, the gate mark 74 cannot be formed on the opposite surface. Accordingly, the gate mark 74 should be formed on the cam surface 73.

First and second stopper 76a and 76b are formed on the cam surface 73, and the gate mark 74 is located between the first and second stoppers 76a and 76b. Each of the first and second stoppers 76a and 76b has a height such that the cam follower 31a cannot get over the stoppers 76a and 76b, which prevents the cam follower 31a from interfering with the gate mark 74. Each of the first and second stoppers 76a and 76b extends along a radial direction of the cam gear 72.

Figure 3:
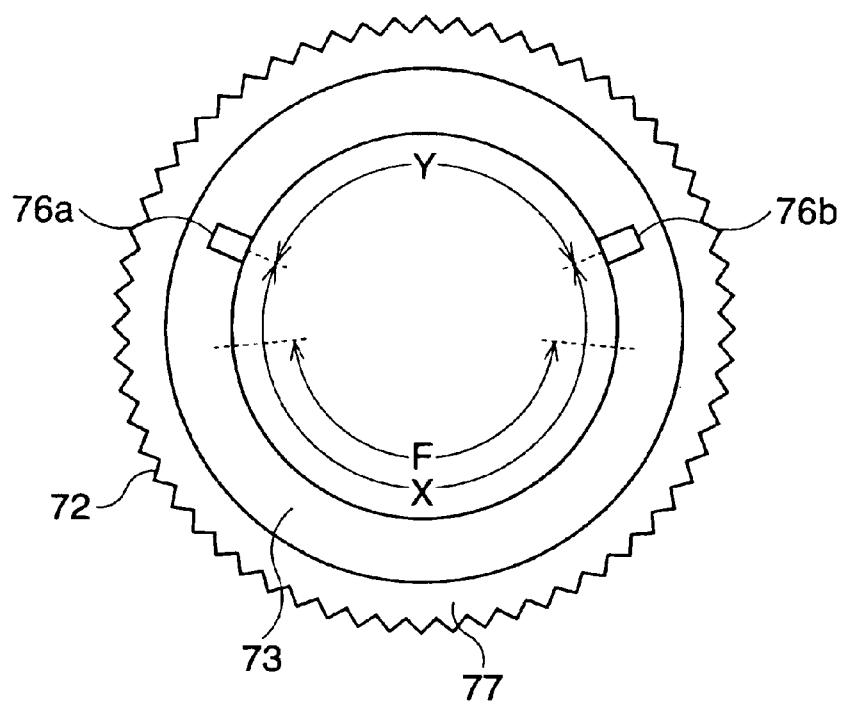
FIG. 3 is a view schematically showing gate mark, and first and second stoppers.

With reference to FIG. 3, a range, in which the gate mark 74 and the first and second stoppers 76a and 76b are provided, is explained below.

As described above, the cam surface 73 of the cam gear 72 is provided with the operative area which is inclined relative to a plane perpendicular to the optical axis, and the rear lens group 40 is displaced along the optical axis in accordance with change of a position in the operative area, with which the cam follower 31a engages. On the cam surface 73, the operative area X functioning as a cam is provided over approximately ⅔ of the whole periphery, and an area other than the operative area X is a non-operative area Y which is not inclined and does not function as a cam.

The stepping motor 70 is driven in such a manner that the cam follower 31a comes into contact with only a predetermined focusing area F in the operative area X. Namely, in a normal operation, the cam follower 31a does not come in contact with the non-operative area Y. Therefore, the mold is manufactured in such a manner that the gate mark 74 is formed on the non-operative area Y, so that the cam follower 31a does not interfere with the gate mark 74.

However, if the stepping motor 70 overruns, the cam follower 31a may come off the operative area X and enter the non-operative area Y. Therefore, in the embodiment, the first and second stoppers 76a and 76b are formed at the both end portions of the non-operative area Y. Thus, when the stepping motor 70 overruns, the cam follower 31a hits the first or second stopper 76a or 76b to stop, so that the cam follower 31a is prevented from entering the non-operative area Y. When the cam follower 31a hits the first or second stopper 76a or 76b, the cam gear 72 is controlled to rotate in the reverse direction so that an end of the barrier 72a passes through the initial position sensor 90, so that the lens moving device can be returned to a normal condition.

The gate mark 74 is acceptable so long as the gate mark 74 is prevented from interfering the cam follower 31a, and thus the gate mark 74 may be formed on the stopper 76a or 76b, for example.

The stoppers 76a and 76b are provided at both end portions of the non-operative area Y, in the embodiment. However, if the height of the step 100 (see FIG. 2) between the lowest position of the cam surface 73 and the non-operative area Y is so high that the cam follower 31a cannot get over the step 100, the stopper may be provided only at the end of the non-operative area Y of the cam surface 73, in which the step is not provided. Namely, only the second stopper 76b may be provided.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-193969 (filed on Jun. 28, 2000) which is expressly incorporated herein, by reference, in its entirety.

What is claimed is:

1. A lens moving device comprising:

a lens support mechanism that supports a lens in such a manner that said lens moves along the optical axis thereof;

a drive source that moves said lens along the optical axis;

a cam member that is rotated by said drive source, said cam member being molded from synthetic resin and being provided with a stopper and a ring-shaped cam surface that includes an operative area and a non-operative area, said operative area having a portion which is inclined with respect to a plane perpendicular to the optical axis of said lens; and a cam follower that comes in contact with said cam member to transmit the rotational movement of said cam member to said lens support mechanism as a linear movement of said lens along the optical axis;

wherein said cam follower comes into contact with said operative area of said cam surface during an normal operation and does not come in contact with said non-operative area of said cam surface during a normal operation, said non-operative area having a gate mark formed during the resin molding process, said stopper preventing said cam follower from interfering with said gate mark.

2. A device according to claim 1, wherein said cam follower is provided to said lens support mechanism.

3. A device according to claim 1, wherein said stopper has a height such that said cam follower cannot get over said stopper, and extends along a radial direction of said cam member.

4. A device according to claim 1, wherein said stopper comprises first and second stopper members, which are located at both end portions of said non-operative area.

5. A lens moving device comprising:

a lens support that supports a lens in such a manner that said lens moves along the optical axis thereof;

a cam member having a ring-shaped cam surface that includes an operative area and a non-operative area, said cam member being molded from synthetic resin, said operative area having a portion which is inclined with respect to a plane perpendicular to the optical axis of said lens, said non-operative area having a gate mark formed during the resin molding process;

a mover that moves said cam member;

a cam follower that comes in contact with said operative area to transmit the movement of said cam member to said lens support to move said lens in a normal operation, and that does not come in contact with said non-operative area during said normal operation; and a preventer that prevents said cam follower from interfering with said gate mark.

* * * * *